(12) United States Patent
Song et al.

(10) Patent No.: US 8,276,378 B2
(45) Date of Patent: Oct. 2, 2012

(54) SYSTEM AND METHOD FOR CONTROLLING A TWO-STAGE SERIES SEQUENTIAL TURBOCHARGER USING BYPASS VALVE LEAKAGE CONTROL

(75) Inventors: B. Jerry Song, Novi, MI (US); Ping Ge, Northville Township, MI (US); Zhiping Steven Liu, Canton, MI (US); Anupam Gangopadhyay, Mrc Nagar (IN)

(73) Assignee: GM Global Technology Operations LLC

( * ) Notice: Subject to any disclaimer, the term of this patent is extended or adjusted under 35 U.S.C. 154(b) by 491 days.

(21) Appl. No.: 12/507,455

(22) Filed: Jul. 22, 2009

(65) Prior Publication Data

US 2011/0016862 A1 Jan. 27, 2011

(51) Int. Cl.
 *F02D 23/00* (2006.01)
 *F02G 3/00* (2006.01)
 *F02B 33/44* (2006.01)
(52) U.S. Cl. ............... 60/602; 60/600; 60/612; 60/614
(58) Field of Classification Search .............. 60/602, 60/612, 598, 614, 600
 See application file for complete search history.

(56) References Cited

U.S. PATENT DOCUMENTS

| | | | | |
|---|---|---|---|---|
| 3,564,273 A | * | 2/1971 | Cockrell | 290/40 R |
| 4,781,027 A | * | 11/1988 | Richter et al. | 60/602 |
| 5,214,919 A | * | 6/1993 | Jiewertz et al. | 60/602 |
| 5,605,044 A | * | 2/1997 | Zimmer et al. | 60/602 |
| 6,595,018 B2 | * | 7/2003 | Goth et al. | 62/259.2 |
| 7,735,320 B2 | * | 6/2010 | Yanakiev | 60/602 |
| 7,958,730 B2 | * | 6/2011 | Stewart | 60/612 |
| 2005/0188696 A1 | * | 9/2005 | Herz et al. | 60/612 |
| 2006/0059910 A1 | * | 3/2006 | Spaeder et al. | 60/612 |
| 2006/0086089 A1 | * | 4/2006 | Ge | 60/599 |
| 2007/0169479 A1 | * | 7/2007 | Nicolle et al. | 60/612 |
| 2007/0295007 A1 | * | 12/2007 | McNulty et al. | 60/602 |
| 2008/0053088 A1 | * | 3/2008 | Yanakiev | 60/602 |
| 2008/0148727 A1 | * | 6/2008 | de Ojeda | 60/602 |

* cited by examiner

*Primary Examiner* — Thomas Denion
*Assistant Examiner* — Cameron Setayesh (57) ABSTRACT

A method of controlling a turbocharger for an engine and a control system for the same includes a variable nozzle turbine control module operating a variable nozzle turbine of a high pressure turbocharger closed loop in a first load-engine speed region. The system also includes a high pressure turbine bypass valve control module operating a high pressure turbine bypass valve in a closed position in a first load-engine speed region. The variable nozzle turbine control module operates a variable nozzle turbine closed loop in a second load-engine speed region between the first load-speed region and a third load speed region. The high pressure turbine bypass valve module operates the high pressure turbine bypass valve in a transient region in the second load-engine speed region. The variable nozzle turbine control module operates the variable nozzle turbine open loop. The high pressure turbine bypass valve control module operates a high pressure turbine bypass valve in an open position in a third load-engine speed region.

20 Claims, 7 Drawing Sheets

SYSTEM AND METHOD FOR CONTROLLING A TWO-STAGE SERIES SEQUENTIAL TURBOCHARGER USING BYPASS VALVE LEAKAGE CONTROL

FIELD

The present disclosure relates to internal combustion engines, and more particularly to a method of controlling a sequential two-stage turbocharger of the internal combustion engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Increasing fuel economy is a desirable goal for auto manufacturers. Consumers desire high fuel economy without sacrificing performance. Turbocharging provides a method for increasing performance during demanding conditions while reducing the overall fuel economy of the vehicle since a smaller displacement engine can be used.

One type of turbocharging system is a two-stage series sequential turbocharger. In such a two-stage system, a high-pressure turbine and a low-pressure turbine are provided in-series. When the engine is working at high load or high speed or both, the turbocharging system may use only the low-pressure turbine while bypassing the high-pressure turbine. When the engine load and speed are not high, the high-pressure turbine and low-pressure turbine work together in-series.

Sequential turbochargers typically include a bypass valve that is controlled differently for different engine conditions. The actuation strategy for the valve is important for smooth transient controls and steady state performance. The bypass valve has a significant flow leakage at its nominal closed position which creates an indeterminate condition for control and operation.

SUMMARY

Accordingly, the present disclosure provides a system and method for regulating the degree of closure and therefore the leakage amount of the bypass valve so that control may take advantage thereof.

In one aspect of the disclosure, a method for controlling an engine with a turbocharging system with a high pressure turbocharger and a low pressure turbocharger includes operation in three load-engine speed regions. In a first load-engine speed region, the method includes operating a variable nozzle turbine of the high pressure turbocharger closed loop and operating a high pressure turbine bypass valve in a closed position. In a second load-engine speed region between the first load-speed region and a third load speed region, the method includes operating a variable nozzle turbine closed loop and operating the high pressure turbine bypass valve in a transient region. In a third load-engine speed region, the method includes operating the variable nozzle turbine open loop and operating a high pressure turbine bypass valve in an open position.

In yet another aspect of the disclosure, a control system includes a variable nozzle turbine control module operating a variable nozzle turbine of a high pressure turbocharger closed loop in a first load-engine speed region. The system also includes a high pressure turbine bypass valve control module that operates a high pressure turbine bypass valve in a closed position in a first load-engine speed region. The variable nozzle turbine control module operates a variable nozzle turbine closed loop in a second load-engine speed region between the first load-speed region and a third load speed region. The high pressure turbine bypass valve module operates the high pressure turbine bypass valve in a transient region in the second load-engine speed region. The variable nozzle turbine control module operates the variable nozzle turbine open loop. The high pressure turbine bypass valve operates a high pressure turbine bypass valve in an open position in a third load-engine speed region.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
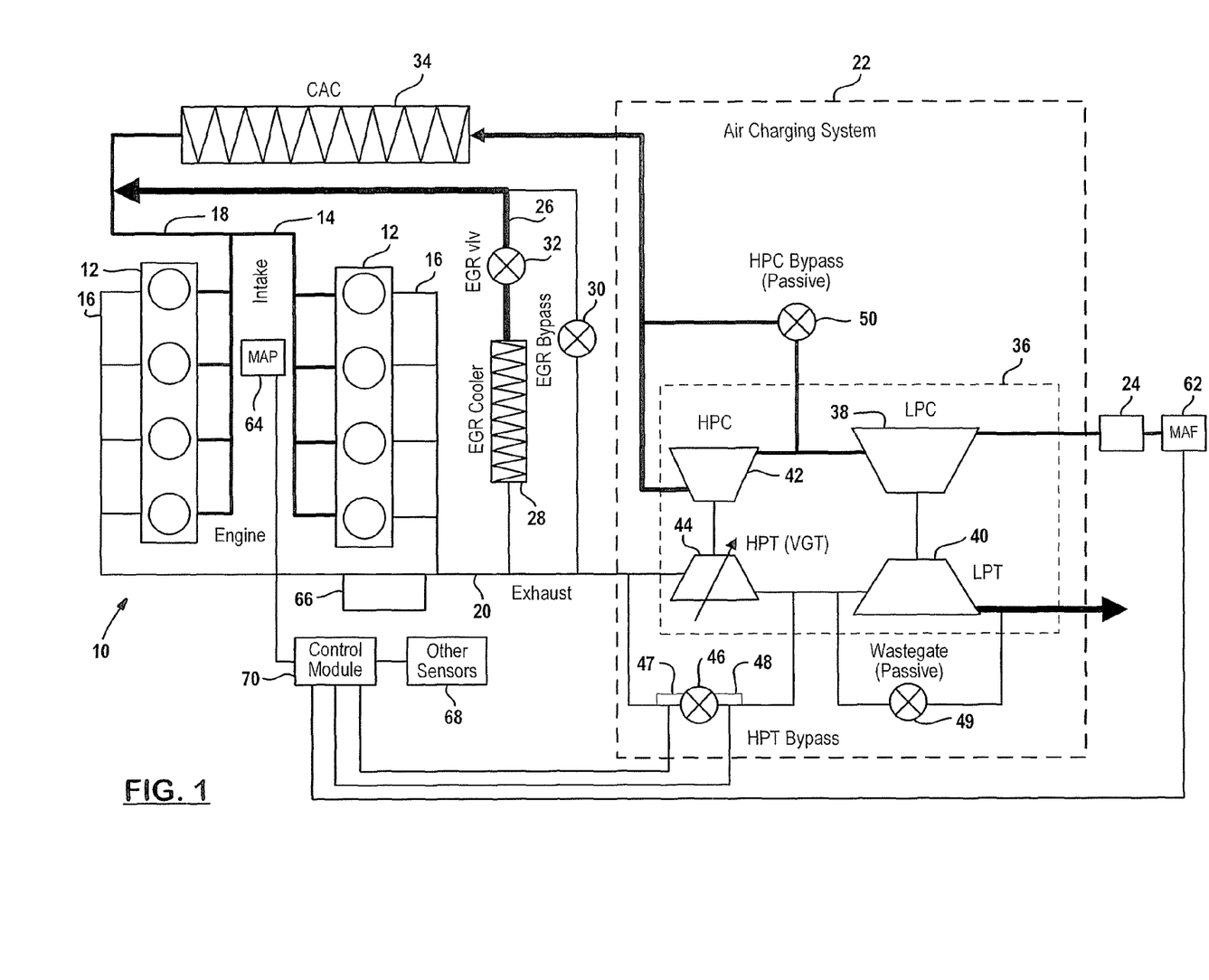
FIG. 1 is a functional block diagram of an engine system including charging system according to the present disclosure.

Referring now to FIG. 1, an engine 10 includes a cylinder block 12 having various number of cylinders, an intake manifold 14 and an exhaust manifold or manifolds 16. The intake manifold includes an air inlet 18. The exhaust manifold 16 has an exhaust outlet 20. The engine 10 is in communication with an air charging system 22. The charging system 22 may be a two-stage series sequential turbocharger. The charging system 22 receives airflow from an inlet throttle 24. The inlet throttle 24 may be a blade or butterfly-type inlet throttle. A barrel-type throttle may also be used. The inlet throttle 24 is a valve that has an opening area that may be increased or decreased according to a control method as will be described below. Should the system be used for a diesel engine, the throttle 24 may be eliminated or located in other places.

An exhaust gas recirculation (EGR) valve 32 controls exhaust gas flow for emission reduction from the exhaust outlet 20 to the inlet 18. The EGR valve 32 also has a controllable opening area that can be increased or decreased according to a control method. The inlet airflow from the EGR valve 32 and the inlet throttle 24 combine to form a total inlet airflow into the engine 10.

The exhaust gas recirculation valve may be in-series with an exhaust gas recirculation cooler 28. An EGR bypass valve 30 may be used to bypass the EGR valve 32 and the EGR cooler 28. The EGR bypass valve 30 is in parallel to the series combination of the EGR valve 32 and the EGR cooler 28.

The charging system 22 has an outlet that is provided to a charge air cooler (CAC) 34. The charge cooler 34 cools the inlet airflow prior to the intake manifold 14. The charging system 22, as mentioned above, may include a two-stage series sequential turbo charger 36. The two-stage series sequential turbo charger 36 may include a low-pressure compressor 38 that is directly coupled to a low-pressure turbine 40. The two-stage series sequential turbo charger 36 may also include a high-pressure compressor 42 in mechanically connected with a high-pressure turbine 44. The high-pressure turbine 44 may be a variable geometry turbine. The low-pressure turbine 40 may be a fixed geometry turbine. Both turbines 40, 44 are driven by exhaust gases from the exhaust outlet 20.

A high-pressure turbine bypass valve 46 may be used to bypass the high-pressure turbine 44. By opening the bypass valve, the high-pressure turbine is essentially bypassed. In the closed position, the bypass valve 46 forces exhaust gases through the high-pressure turbine 44. A position sensor 47 may be used to generate a position signal corresponding to an amount of opening of the valve 46 including fully closed, fully opened and positions therebetween. A current sensor 48 generates a signal corresponding to an amount of exhaust flowing to the valve 46.

A waste gate 49 may be used to bypass the low-pressure turbine 40. Typically, the waste gate 49 will operate only under extreme pressure conditions as a safety. The high-pressure compressor 42 and the low-pressure compressor 38 are used to compress intake air from the intake throttle 24.

A bypass valve 50 disposed between the low-pressure compressor 38 outlet and the high-pressure compressor 42 outlet is used to bypass the high-pressure compressor. Air traveling through the bypass valve 50 exits the charging system 22 and is provided to the charge air cooler (CAC) 34.

A mass airflow sensor 62 generates a mass airflow signal corresponding to the mass of air in the intake of the system.

A manifold absolute pressure sensor 64 disposed within the intake manifold 14 generates a manifold pressure signal. The manifold absolute pressure signal may be used to determine the pressure ratio of the system and control the high pressure turbine bypass valve 46 and the inlet throttle 24.

An exhaust manifold pressure sensor 66 may generate a pressure signal corresponding to the pressure of exhaust gasses in the exhaust manifold. The exhaust manifold pressure may also be derived from other sensors 68 typically found on an engine. The other sensors 68 may include an engine speed sensor, a fuel quantity sensor, an injection timing sensor, an intake manifold sensor and an engine coolant temperature sensor. For simplicity, the other sensors are all illustrated in the other sensor block 68.

A control module 70 is in communication with the mass airflow sensor 62, the manifold absolute pressure 64, the exhaust manifold pressure sensor 66, the EGR valve 32, the bypass valve 46 and the inlet throttle 24. As will be described below, the control module 70 independently controls the bypass valve 46 and VGT 44.

Figure 2:
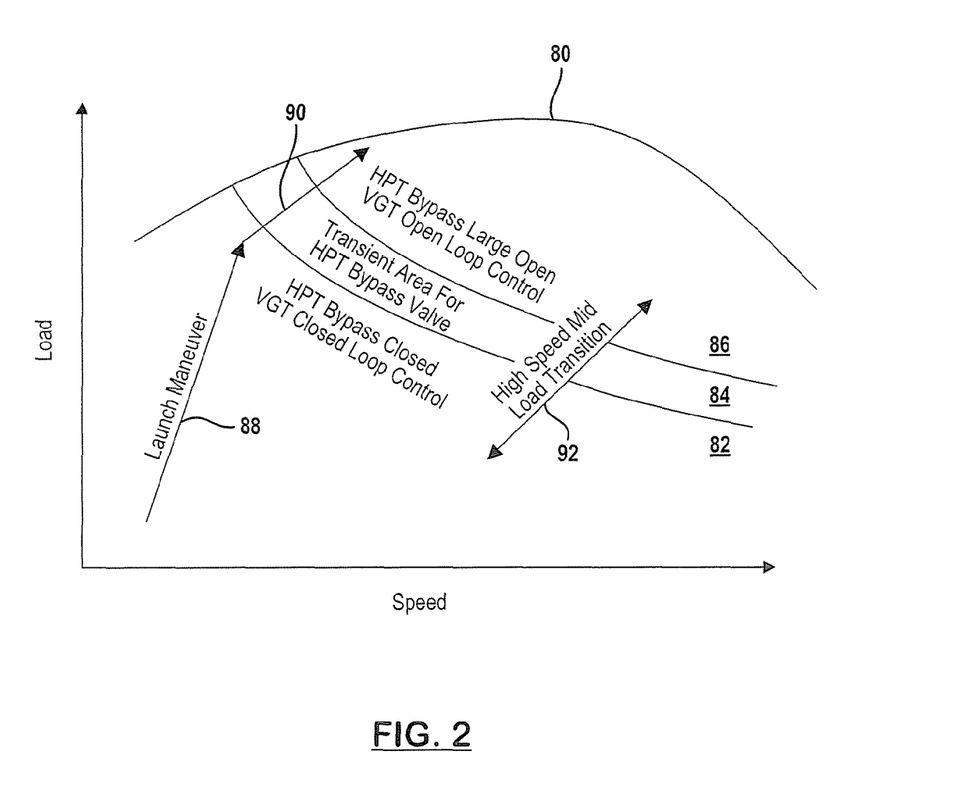
FIG. 2 is a load versus speed plot illustrating various operating regions for the high-pass valve and the variable nozzle turbine.

Referring now to FIG. 2, a plot of load versus speed for operating an engine is set forth. The load versus speed boundary is illustrated by reference numeral 80. The operation of the engine is divided into three regions that include a first region 82, a second region 84 and a third region 86. The first region 82 is when the high-pressure turbine bypass valve 46 illustrated in FIG. 1 is closed. The variable nozzle or variable geometry turbine is in the closed loop control state for boost pressure. As will be described below, this state is when the high-pressure turbocharger meets the needs of the system. The first region is particularly useful during a launch maneuver 88 when the vehicle accelerates from a stopped position. The launch maneuver is indicated by arrow 88. In the third region, the high-pressure turbine bypass valve 46 is in an open or almost-open position and the variable geometry turbine is in an open loop for boost pressure control. The bypass valve is thus position controlled and thus a position sensor is used for the feedback. The second region 84 corresponds to a transient area for the high-pressure turbine bypass valve 46 of FIG. 1. In the second region, the variable nozzle of the turbine is set at a maximum position while the bypass valve may be controlled in various manners including providing controlled leakage. The boundary between the first region 82 and second region 84, shifts upward as increasing amounts of leakage flow are allowed via the bypass valve. Therefore, the effective control region for variable nozzle turbine closed loop control is expanded, for greater boost control authority. Transition between the three regions 82-86 takes place during high speed and mid-load transitions as indicated by arrow 92. In the second region 84, by continuously modulating the bypass valve 46, the bypass may be controlled and thus a particular level of control may be generated by the sequential turbocharging system.

Figure 3:
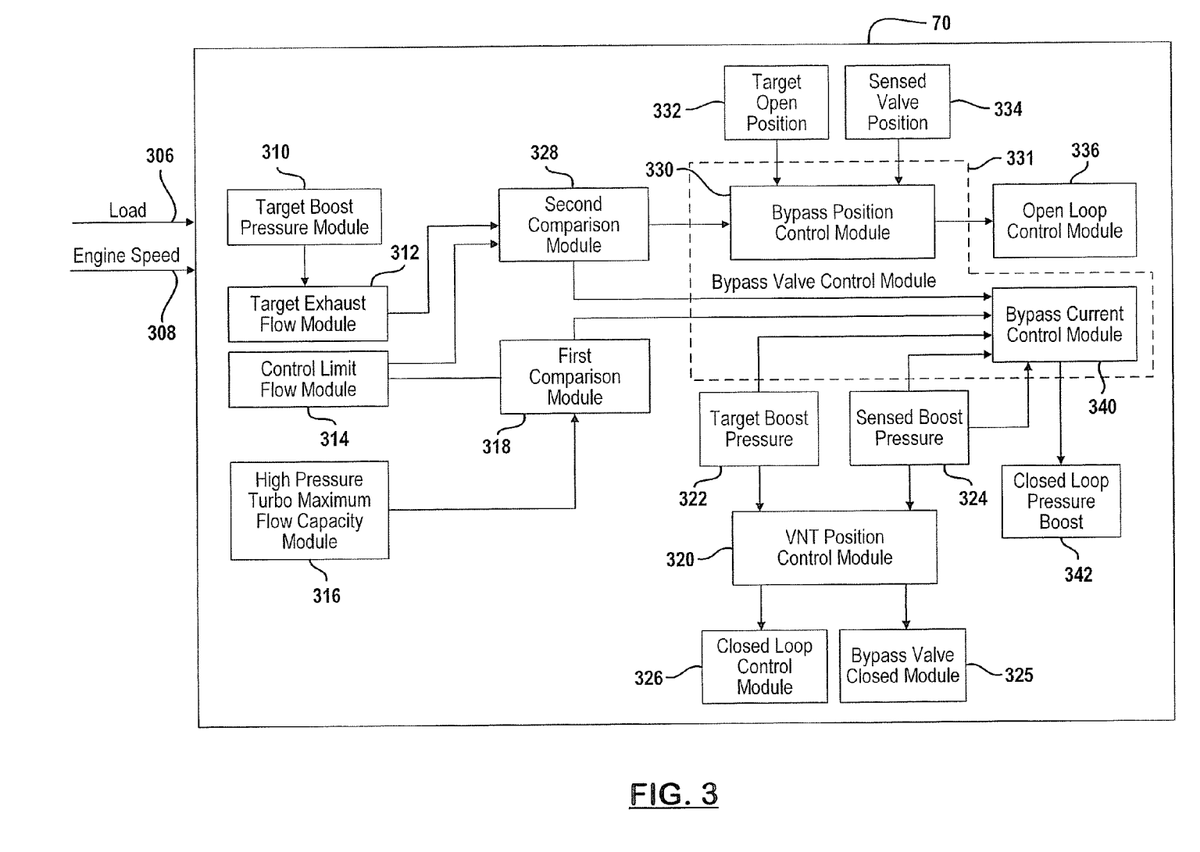
FIG. 3 is a functional block diagram of the controller of FIG. 1.

Referring now to FIG. 3, the control module 70 of FIG. 1 is illustrated in further detail. The control module 70 may receive a load signal 306 and engine speed signal 308. The load signal 306 and the engine speed signal 308 may also be generated within the control module 70. A target boost pressure module 310 generates a target boost pressure from the load signal 306 and the engine speed signal 308. Both the engine load signal and the engine speed signal are used to generate the target boost pressure. The engine speed signal and the target boost pressure signal from the target boost pressure module 310 are used to generate a target exhaust flow signal from the target exhaust flow module 312. A control limit flow module provides a control limit to the operation of the turbocharging system. The control limit flow module 314 may be a calibrated value based upon the characteristics of the engine and the associated turbocharger.

A high-pressure turbo maximum flow capacity module 316 generates a high-pressure turbo maximum flow capacity signal. The high-pressure turbo maximum flow capacity signal may also be a calibrated amount that corresponds to the maximum flow capacity that is available through the turbocharging system, and more specifically through the high-pressure turbocharger. A first comparison module 318 receives the target exhaust flow signal from the target exhaust flow module 312 and the high-pressure turbo max flow capacity signal from the high-pressure turbo maximum flow capacity module 316. When the limit of the turbocharger has not been reached, the turbocharger position control module 320, together with a target boost pressure 322 and a sensed boost pressure 324, are used to control a bypass closed module 325 that generates the maximum current available for closing the bypass valve into its closed position. By forcing the bypass valve into a closed position, leakage from the bypass valve will be minimized. The current controlled range, for nominally closed positions, may be indicated by negative pulse width modulation frequency, while the open positions, are indicated by positive pulse width modulation values.

The turbo position control module 320 may also closed loop control the boost pressure from the turbocharger. The operation of modules 320, 325 and 326 above corresponds to operation within the first region of FIG. 2.

A second comparison module 328 receives a control limit flow signal from the control limit flow module 314 and a target exhaust flow signal from the target exhaust flow module 312. The second comparison module 328 performs a comparison when the target exhaust flow is greater than the control limit bypass position control module 330 which is in a bypass valve control module 331 along with a target open position from module 332 and a sensed valve position from module 334 are used to control the bypass valve by position and the turbocharger runs in an open loop using open loop control module 336. The comparisons in modules 318 and 328 are also provided to a bypass current control module 340, which is also in the bypass valve control module 331. When the target exhaust flow is greater than or equal to the control limit flow and the turbocharger maximum flow capacity is less than or equal to the target exhaust flow, region two operation is provided. In region two, the variable nozzle turbine is kept at a maximum open position and the bypass valve is current controlled in the bypass current control module 340. Current control in region two allows a controlled leakage. The bypass current control module 340 receives a target boost pressure from the target boost pressure module 322 and the sensed boost pressure from the sensed boost pressure module 324. Closed-loop control from closed-loop pressure boost control module 342 is provided in response to the bypass current from the bypass current control module 340. The operation of the bypass current control module 340 will be described further below. The bypass current control module 340 may be a PID controller.

Figure 4:
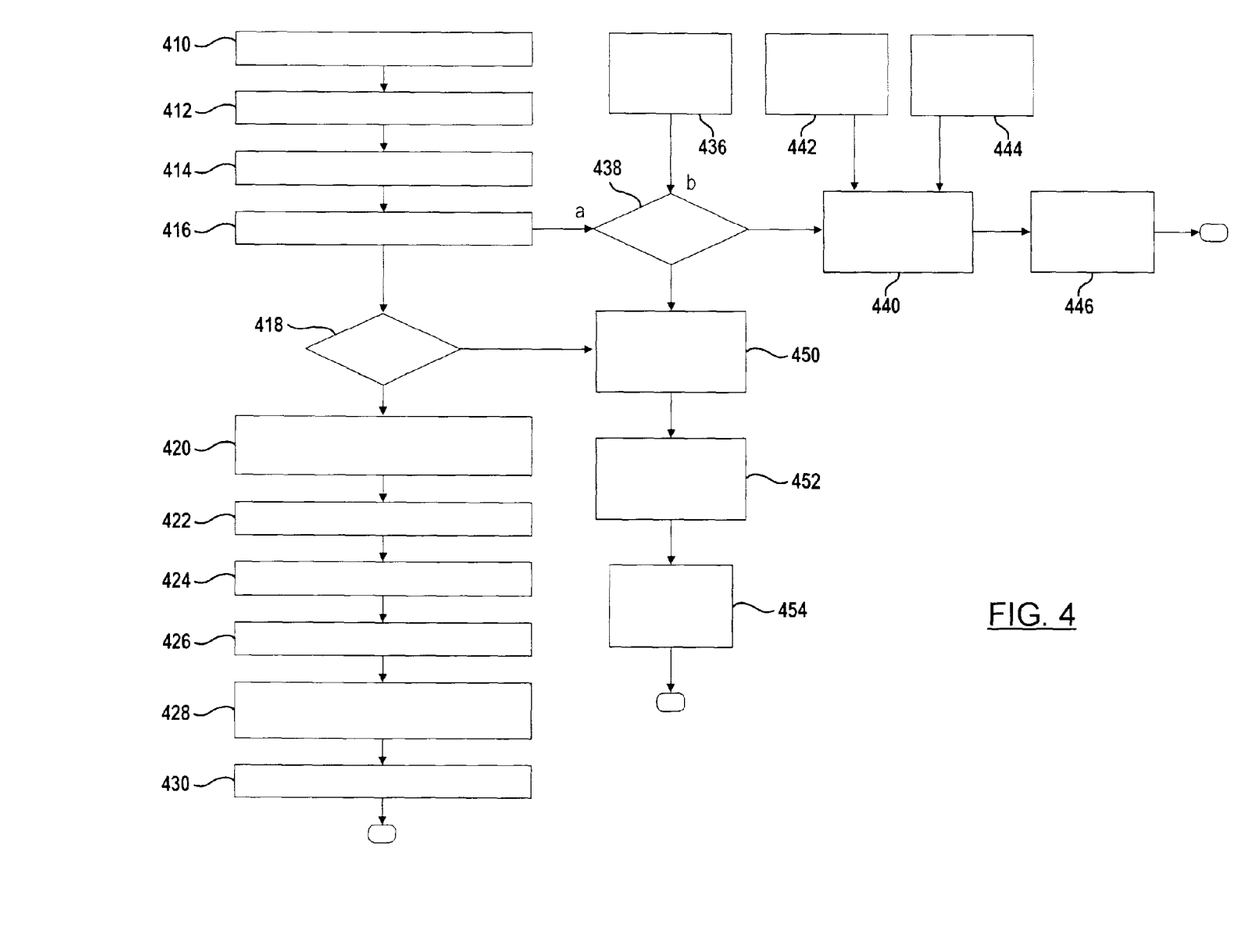
FIG. 4 is a flowchart of a method for controlling the bypass valve and the variable nozzle turbine.

Referring now to FIG. 4, a method for controlling a turbocharging system is set forth. In step 410, the engine load is determined. In step 412, the speed of the engine is determined. In step 414, the target boost pressure is determined from the engine load. In step 416, the target exhaust flow rate is determined from the speed from step 412. In step 418, the target exhaust flow and a variable nozzle turbine maximum flow capacity from step 420 are compared. When the maximum flow capacity is not less than or equal to the target exhaust flow, step 422 determines a target boost pressure and step 424 determines a sensed boost pressure. Step 426 determines the variable nozzle turbine position control using a PID controller. The variable nozzle turbine control may receive the target boost pressure signal from step 422 and a sensed boost pressure signal from step 424. The target boost pressure signal and the sensed boost pressure signal may be used to determine the variable nozzle turbine position. In step 428, the bypass control valve is tightly closed using a maximum current. This may be performed by using a negative pulse width modulated signal. In step 430, the turbocharger is operated using a closed-loop pressure boost using the sensed boost pressure and the target boost pressure. By tightly closing the bypass valve in step 428, the amount of leakage is through the bypass valve is thus minimized.

In step 436, a control limit flow is determined. The control limit flow may be determined using a calibration process based upon the characteristics of the turbocharger. The control limit flow and the target exhaust flow are provided to a comparison step 438. In step 438 the target exhaust flow and the control limit flow are compared. When the target exhaust flow is greater than or equal to the control limit flow, the bypass valve has its position controlled using a PID controller in step 440. Step 440 uses a target open position 442 and a sensed valve position 444 to control the position of the bypass controller. In step 446, the bypass control is run open loop to obtain the desired boost pressure.

Step 450 is performed after steps 418 and 438 when the comparisons do not route the control in another direction. More specifically, step 450 corresponds to region two of FIG. 2. Step 450 is reached when the maximum flow capacity is less than or equal to the target exhaust flow and the target exhaust flow is not greater than or equal to the control limit flow from step 436. In step 450, the variable nozzle turbine has its orifice at a maximum position. Thereafter, step 452 uses current control to control the bypass valve using a PID controller. The current control is performed using a target boost pressure from step 422 and a sensed boost pressure from step 424. The system operates in closed loop boost pressure in step 454. (note: need a label 454 in the FIG. 4) Thus, the closed loop is performed using the target boost pressure and the sensed boost pressure.

It should be noted that the control limit flow is greater than the turbo maximum flow capacity.

Figure 5:
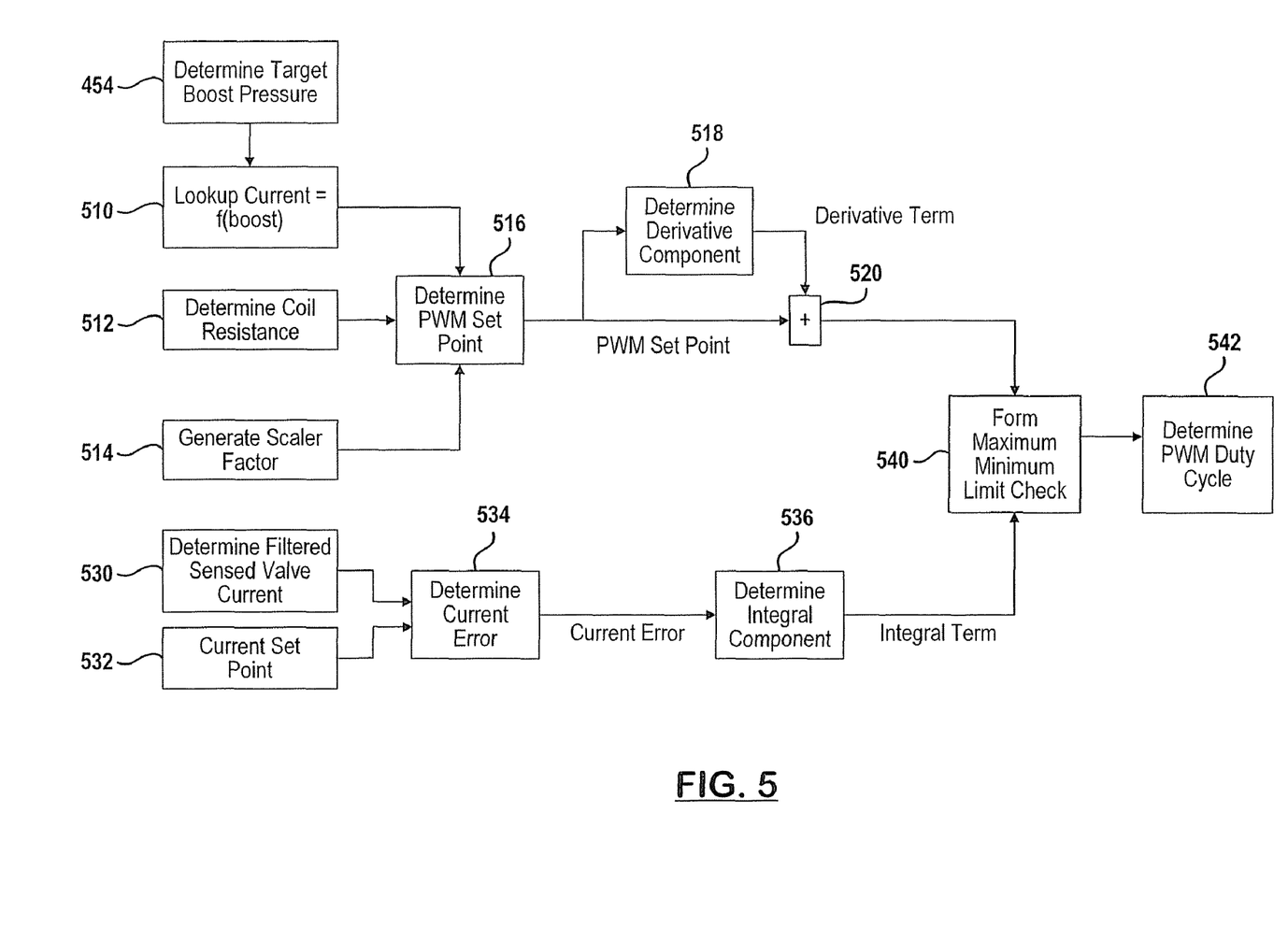
FIG. 5 is a flowchart of a method for integral and derivative control of the PID control bypass valve.

Referring now to FIG. 5, details of the PID control from step 452 are illustrated in further detail.

In step 454, the target boost pressure 454 from FIG. 4 is used to look-up a current that corresponds to the boost in step 510. The coil resistance is determined in step 512. The coil resistance in step 512 may be a fixed value. Likewise, a scaler factor 514 may be generated. In step 516, a PWM set point is determined. Step 516 may combine the current and resistance to determine a pulse width modulated set point. A derivative term may be generated in step 518 and combined with the pulse width modulated set point in the combination step 520.

A filtered sensed valve current is determined in step 530. The current set point is provided in step 532. A current error is determined in step 534 to obtain a current error. An integral term is generated in step 536 corresponding to the current error. The integral term from step 536 and the derivative term from step 520 are combined to form a maximum and minimum limit check in step 540. The maximum and minimum limit checks are used to determine a pulse width modulated duty cycle in step 542.

Figure 6:
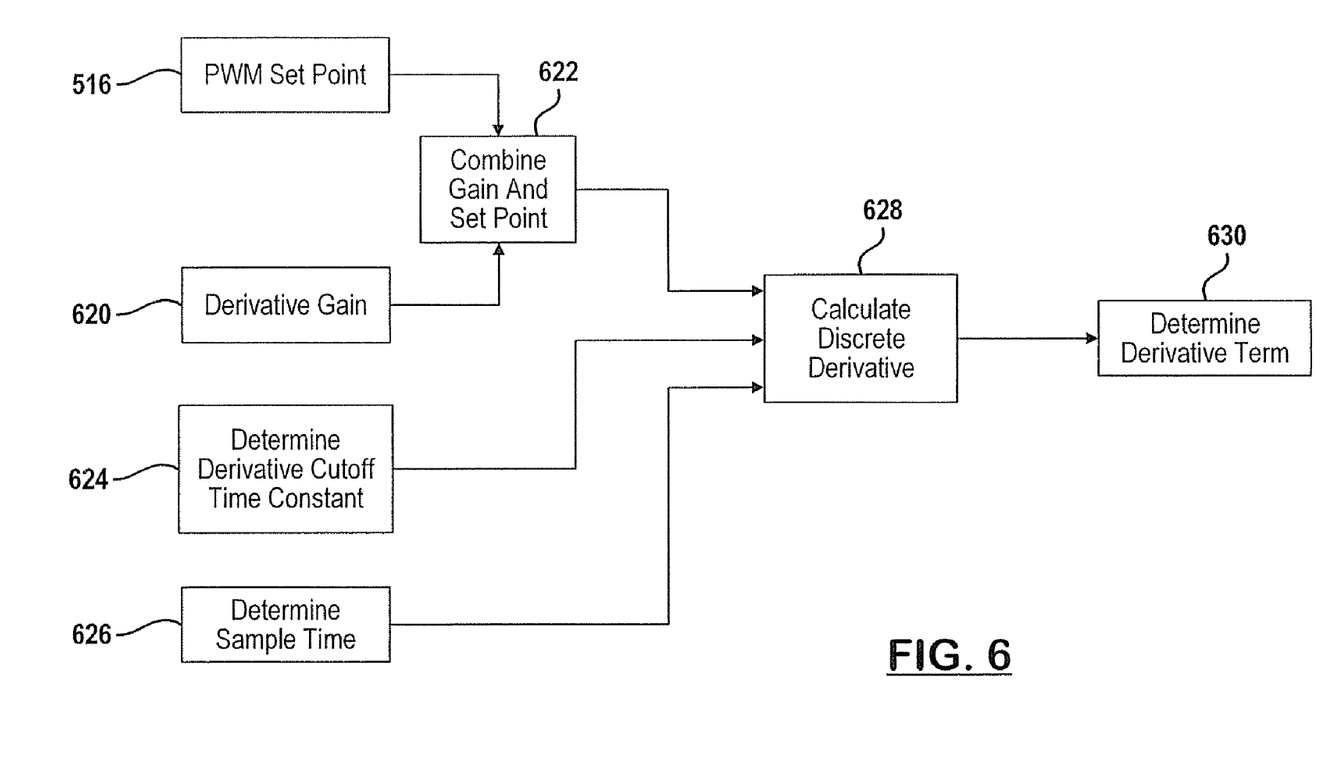
FIG. 6 is a flowchart of a method for providing the derivative part of the PID control for the bypass current control of FIG. 4.

Referring now to FIG. 6, the derivative step of 518 of FIG. 5 is illustrated in further detail. A pulse width modulation set point from step 516 and a derivative gain 620 are combined in step 622. A derivative cut-off time constant is determined in step 624. A sample time is determined in step 626. The derivative gain and the pulse width modulation set point, the derivative cut-off time and the sample time are combined in a discreet derivative calculation of step 628. The discreet derivative calculation is used to generate a derivative term in step 630 as illustrated as the output of the derivative component step 518 of FIG. 5.

Figure 7:
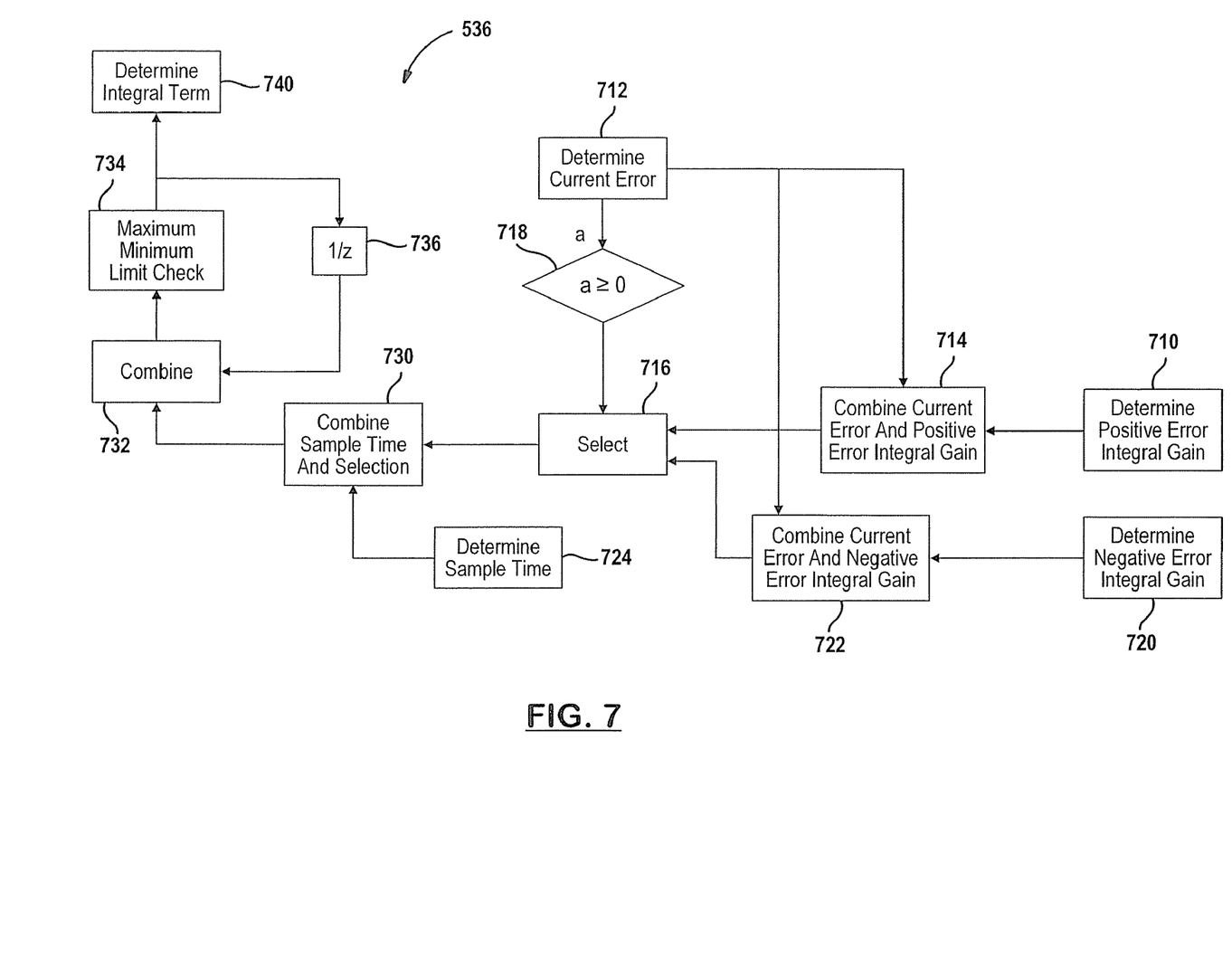
FIG. 7 is a method for determining the integral term of the bypass current PID control of FIG. 4.

Referring now to FIG. 7, the details of the integral component 536 of FIG. 5 are set forth in further detail. In step 710, a positive error integral gain is determined. In step 712, a current error is determined. The positive error integral gain 710 is combined with a current error 712 in step 714. The combination of the current error and the positive error integral gain is selected in step 716. When the current error is greater than or equal to zero in step 718, a selection may occur in step 716. In step 720, a negative error gain is determined. The negative error integral gain 720 may be combined with the current error from step 712 in a multiplication or combination step 722. The current error based integral gain positive or negative is selected in the selection block 716. In step 724, a sample time is determined. In step 730, the selection from step 716 and the sample time from step 724 are combined with the selection of the positive current error and the negative current error. The combination step performed in 730 may be multiplication. A combination of the output of block 730 may be performed in step 732 with the feedback from a maximum minimum limit check of step 734. The feedback may be provided through a filter step 736 and used to provide the integral term in step 740 from the integral step 536.

As is set forth in the present disclosure, the current control of the bypass valve allows a predetermined amount of leakage to be applied to allow fine-tuning of the control of the turbocharging system. More specifically, fine-tuning of the operation of the high-pressure turbine bypass valve allows controlled operation and boost from the high-pressure turbine.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method for controlling an engine including a turbocharging system with a high pressure turbocharger and a low pressure turbocharger, comprising:
   in a first load-engine speed region, operating a variable nozzle turbine of the high pressure turbocharger in a transient position by performing closed loop control of the variable nozzle turbine based on boost pressure, and operating a high pressure turbine bypass valve in a closed position;
   in a second load-engine speed region between the first load-engine speed region and a third load-engine speed region, operating the variable nozzle turbine in a maximum open position, and operating the high pressure turbine bypass valve in a transient position by performing closed loop control of the high pressure turbine bypass valve based on a position of the high pressure turbine bypass valve and a measured current flowing to the high pressure turbine bypass valve; and
   in the third load-engine speed region, operating the variable nozzle turbine in a transient position by performing open loop control of the variable nozzle turbine based on boost pressure, and operating the high pressure turbine bypass valve in a transient position by performing closed loop control of the high pressure turbine bypass valve based on the position of the high pressure turbine bypass valve.

2. A method as recited in claim 1 further comprising determining a target exhaust flow from a target boost pressure.

3. A method as recited in claim 2 further comprising determining the target boost pressure from an engine load and an engine speed.

4. A method as recited in claim 3 further comprising operating in the first load-engine speed region when a high pressure turbocharger maximum flow capacity is greater than the target exhaust flow.

5. A method as recited in claim 3 further comprising operating in the third load-engine speed region when the target exhaust flow is less than a control limit flow.

6. A method as recited in claim 3 further comprising operating in the second load-engine speed region when a high pressure turbocharger maximum flow capacity is less than the target exhaust flow and when the target exhaust flow is greater than a control limit flow.

7. A method as recited in claim 1 further comprising controlling the current to the high pressure turbine bypass valve based on a target boost pressure and a sensed boost pressure in the second load-engine speed region.

8. A method as recited in claim 1 further comprising controlling the current to the high pressure turbine bypass valve to control leakage through the bypass valve in the second load-engine speed region.

9. A method as recited in claim 1 wherein in the second load-engine speed region, operating the high pressure turbine bypass valve in the transient position by performing closed loop control of the high pressure turbine bypass valve based on the current flowing to the high pressure turbine bypass valve comprises generating current to force the high pressure turbine bypass valve to the closed position.

10. A method as recited in claim 1 wherein in the second load-engine speed region, operating the high pressure turbine bypass valve in the transient position by performing closed loop control of the high pressure turbine bypass valve comprises modulating the high pressure turbine bypass valve using a negative pulse width modulated signal.

11. A method as recited in claim 1 wherein in the second load-engine speed region, controlling the position of the high pressure turbine bypass valve comprises controlling the position based on a target opening signal and a valve sensor signal.

12. A control system for controlling an engine including a turbocharging system with a high pressure turbocharger and a low pressure turbocharger, comprising:
   a variable nozzle turbine control module that operates a variable nozzle turbine of the high pressure turbocharger in a transient position by performing closed loop control of the variable nozzle turbine based on boost pressure in a first load-engine speed region; and
   a high pressure turbine bypass valve control module that operates a high pressure turbine bypass valve in a closed position in the first load-engine speed region,
   wherein the variable nozzle turbine control module operates the variable nozzle turbine in a maximum open position in a second load-engine speed region between the first load-engine speed region and a third load-engine speed region,
   wherein the high pressure turbine bypass valve control module operates the high pressure turbine bypass valve in a transient position by performing closed loop control of the high pressure turbine bypass valve based on a position of the high pressure turbine bypass valve and a measured current flowing to the high pressure turbine bypass valve in the second load-engine speed region,
   wherein the variable nozzle turbine control module operates the variable nozzle turbine in a transient position by performing open loop control of the variable nozzle turbine based on boost pressure in the third load-engine speed region, and
   wherein the high pressure turbine bypass valve control module operates the high pressure turbine bypass valve in a transient position by performing closed loop control of the high pressure turbine bypass valve based on the position of the high pressure turbine bypass valve in the third load-engine speed region.

13. A control system as recited in claim 12 wherein during the second load-engine speed region, the high pressure turbine bypass valve control module controls the current to the high pressure turbine bypass valve to control leakage through the bypass valve.

14. A control system as recited in claim 12 further comprising:
a first comparison module that generates a first comparison signal when a high pressure turbocharger maximum flow capacity is less than a target exhaust flow, wherein the target exhaust flow is determined based on engine speed and engine load; and
a second comparison module that generates a second comparison signal when the target exhaust flow is greater than a control limit flow,
wherein the variable nozzle turbine control module commands operation in the second load-engine speed region in response to the first comparison signal and the second comparison signal.

15. A system comprising:
an engine;
the high pressure turbocharger having a high pressure variable geometry turbine and a high pressure compressor;
the low pressure turbocharger in series with the high pressure turbocharger having a low pressure turbine and a low pressure compressor;
the high pressure turbine bypass valve bypassing the high pressure turbine; and
the control system as recited in claim 12.

16. A method for controlling an engine system comprising a variable-geometry turbocharger (VGT), the method comprising:
determining a target boost pressure for the VGT based on an engine load and an engine speed;
determining a target exhaust flow based on the target boost pressure;
comparing the target exhaust flow to each of a predetermined limit and a maximum flow capacity of the VGT, wherein the predetermined limit is based on characteristics of at least one of the engine and the VGT, and wherein the predetermined limit is greater than the maximum flow capacity of the VGT; and
when the target exhaust flow is less than or equal to the predetermined limit and greater than the maximum flow capacity of the VGT:
(i) commanding the VGT to a maximum open position, and
(ii) performing closed loop control of a current flowing to a bypass valve for the VGT based on a difference between the target boost pressure and a measured boost pressure, wherein the bypass valve is configured to redirect exhaust gas from the engine to bypass the VGT.

17. The method of claim 16, further comprising when the target exhaust flow is less than or equal to the predetermined limit and less than or equal to the maximum flow capacity of the VGT, performing closed loop control of a position of the bypass valve based on the difference between the target boost pressure and the measured boost pressure.

18. The method of claim 16, further comprising when the target exhaust flow is greater than the predetermined limit, performing open loop control of the bypass valve based on the target boost pressure.

19. The method of claim 16, wherein performing closed loop control of the current flowing to the bypass valve includes fully closing the bypass valve by supplying a maximum current to the bypass valve.

20. The method of claim 16, wherein performing closed loop control of the current flowing to the bypass valve includes supplying a negative pulse width modulated (PWM) current to the bypass valve.

* * * * *